United States Patent [19]

Ritter

[11] 4,342,731
[45] Aug. 3, 1982

[54] METHOD FOR REMOVING HYDROGEN SULFIDE FROM COKE OVEN GAS

[75] Inventor: Horst Ritter, Essen, Fed. Rep. of Germany

[73] Assignee: Dr. C. Otto & Comp. G.m.b.H., Bochum, Fed. Rep. of Germany

[21] Appl. No.: 253,579

[22] Filed: Apr. 13, 1981

[51] Int. Cl.$^3$ .............................................. B01D 53/34
[52] U.S. Cl. ................................... 423/234; 423/220; 423/236; 423/238
[58] Field of Search ................ 423/220, 234, 237, 238

[56] References Cited

U.S. PATENT DOCUMENTS

| 3,789,105 | 1/1974 | Tippmer et al. | 423/234 |
| 3,819,816 | 6/1974 | Wunderlich et al. | 423/234 |
| 4,009,243 | 2/1977 | Weber et al. | 423/234 |

Primary Examiner—Earl C. Thomas
Attorney, Agent, or Firm—Thomas H. Murray

[57] ABSTRACT

An improved sulfur-ammonia process for removing hydrogen sulfide from coke oven gases. In the improved process, a concentrator formerly used for standby operation is used at all normal times as an ammonia scrubber to improve the efficiency of gas separation during normal operation and is used as a concentrator for its intended standby functions during the alternative operations. In its normal function, the concentrator/scrubber functions as a scrubber to strip ammonia gas from recirculating liquid streams and to permit introduction of an ammonia-rich gas into a hydrogen sulfide scrubber to increase the separation efficiency of that unit. In the standby operation, the same concentrator/scrubber serves as a concentrator to concentrate hydrogen sulfide in a "strong liquor" stream for separate recovery as a "strong liquor."

3 Claims, 2 Drawing Figures

METHOD FOR REMOVING HYDROGEN SULFIDE FROM COKE OVEN GAS

This invention relates to a method for removing hydrogen sulfide from coke oven gas employing the sulfur-ammonia method, and more particularly, relates to an improved method which provides two alternative operating modes.

BACKGROUND OF THE INVENTION

Statement of the Prior Art—The sulfur-ammonia method for scrubbing hydrogen sulfide from coke oven gas is described in U.S. Pat. No. 3,789,105. In this sulfur-ammonia method, hydrogen sulfide is removed from the coke oven gas in a hydrogen sulfide stripper by washing with ammoniacal wash water. Thereafter ammonia is recovered from the washed coke oven gas by washing with water in an ammonia stripper. The effluent wash water from the hydrogen sulfide stripper is treated in a deacidifier with ammonia water to release the hydrogen sulfide as a gas which is recovered for subsequent use, e.g., in a sulfuric acid generator. The effluent wash water from the deacidifier is introduced into the hydrogen sulfide stripper as a portion of the ammoniacal wash water. A further improvement in the sulfur-ammonia method provides an absorber for hydrogen sulfide gas. The absorber is employed in those instances when the hydrogen sulfide gas cannot be delivered for processing, e.g., when the following sulfuric acid generator or other plant for processing the hydrogen sulfide gas is out of action. In such instances the hydrogen sulfide vapors are washed in the absorber with coal water to produce a "strong liquor" containing dissolved hydrogen sulfide. The "strong liquor" is in part recycled through the scrubbing tower and in part withdrawn to a "strong liquor" storage facility. The clean gases from the absorber are returned to the hydrogen sulfide scrubber along with coke oven gas. In normal operation of the sulfur-ammonia method, the concentrator is not active but instead is provided for use only during abnormal conditions when the hydrogen sulfide gas stream cannot be directly processed.

One of the shortcomings of this installation is that the concentrator is not employed during the normal operation of the plant.

STATEMENT OF THE INVENTION

According to the present invention, the concentrator is utilized as a scrubber during normal plant operation to strip ammonia gas from the effluent liquor originating in the deacidifier by counter-current contact with a portion of the already washed coke oven gas product stream. The effluent gas stream from the concentrator/scrubber under these circumstances contains washed coke oven gas and stripped ammonia gas. This effluent gas stream is delivered to the hydrogen sulfide stripper along with fresh coke oven gas. The liquid effluent from the concentrator/scrubber under these conditions is in part recycled through the concentrator/scrubber and in part delivered to the hydrogen sulfide stripper as a portion of the ammoniacal wash water. As a result of removing ammonia from the liquid effluent stream from the deacidifer, the resulting water can be supplied to the hydrogen sulfide stripper. This permits greater absorption of ammonia in the hydrogen sulfide stripper. By delivering the effluent gas stream to the middle of the hydrogen sulfide stripper, the ammonia concentration in the hydrogen sulfide stripper is increased which favors the selective washing of hydrogen sulfide.

The concentrator/scrubber remains available for its alternative use as a concentrator for the hydrogen sulfide gases when they cannot be withdrawn for further processing.

In another embodiment, the concentrator/scrubber, operating as a srubber, can be supplied with ammonia-containing liquid streams from other sources in the plant, for example, the condensed vapors from the ammonia stripper.

The use of a scrubber increases the efficiency of hydrogen sulfide recovery during normal operation of the plant.

DESCRIPTION OF THE DRAWINGS

The installation in FIGS. 1 and 2 includes a hydrogen sulfide stripper 2, an ammonia stripper 5, a deacidifier 18 and an ammonia still 22. FIG. 1 also has a concentrator 26 which is a concentrator/scrubber 26 in FIG. 2. Coke oven gas requiring purification is fed through a conduit 1 into the base of the hydrogen sulfide stripper 2. A first washed gas stream comprising washed coke oven gas having a lower hydrogen sulfide content leaves the hydrogen sulfide stripper 2 through line 3 and is introduced into the ammonia stripper 5 preferably by traveling through a gas suction device 4. Water is supplied to the ammonia stripper 5 through line 6. A second washed gas stream is recovered from the top of the ammonia stripper 5 through a line 7 and is recovered from the plant as a first product gas stream. The ammonia stripper 5 has a cooling circuit 8 including a pump 9 and cooler 10. A first liquid effluent stream is recovered from the bottom of the hydrogen sulfide stripper 2 through line 14 and delivered through pump 15, heat exchanger 16 and heat exchanger 17 to the top of the deacidifier 18. A second liquid effluent stream is withdrawn from the base of the ammonia stripper 5 through line 11, pump 12, heat exchanger 13 and is delivered as a ammoniacal wash water to the top of the hydrogen sulfide stripper 2. Within the deacidifier 18, hydrogen sulfide gas is driven from the first liquid effluent stream and is recovered as a second product gas stream from the top of the deacidifier 18 through a line 27 and heat exchanger 19 and delivered to a processing installation such as a sulfuric acid generator. A third liquid effluent stream is recovered from the base of the deacidifier 18 through line 20 and is delivered to the hydrogen sulfide scrubber as a portion of the ammoniacal wash water. A portion of the third liquid effluent stream is withdrawn through a line 21 and delivered to the top of the ammonia still 22 as an ammonia-rich feedstock. Steam is introduced through the line 23 into the base of the ammonia still 22. A first ammonia-rich gas stream is delivered from the top of the ammonia still 22 through a line 25 into the center portion of the deacidifier 18. A second ammonia-rich gas stream is delivered from the central portion of the ammonia still 22 through a line 24 into the base of the deacidifier 18.

Figure 1:
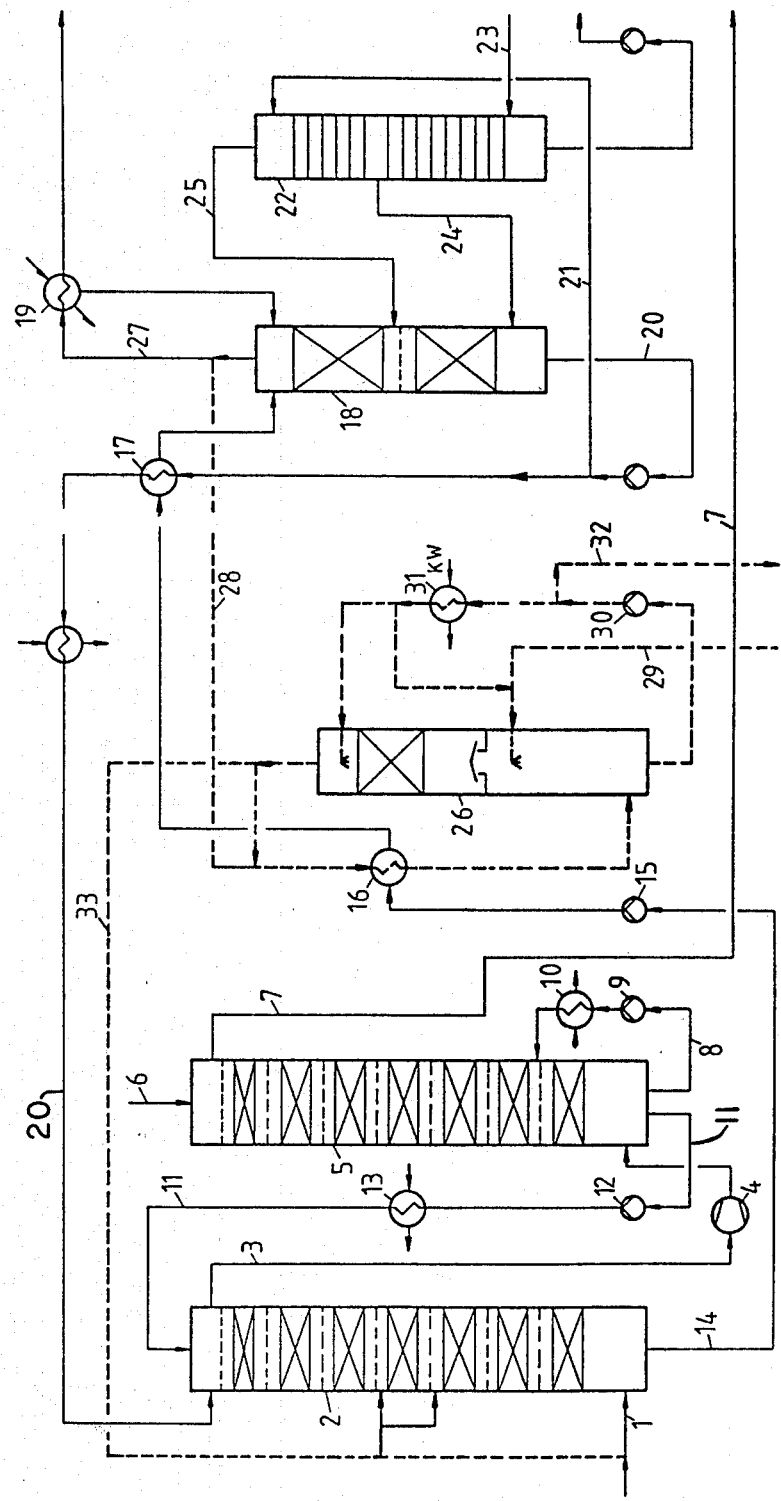
FIG. 1 is a diagram of a prior art sulfur-ammonia process wherein solid flow lines are employed to indicate normal operation and wherein broken lines are employed to indicate the alternative operation.

The first washed coke oven gas stream in line 3 preferably is withdrawn by suction from the stripper 2 through a suction device 4 and forced by pressure into the ammonia stripper 5. This ensures a sufficient pressure gradient to return gaseous ammonia.

As thus described, the sulfur-ammonia process for removing hydrogen sulfide from coke oven gas is well-known in the art.

Also well-known in the art is the normal use of a concentrator 26 to treat the second product gas stream from the top of the deacidifier 18 when that stream cannot be delivered through the line 27 for further continuous processing. In this alternative situation, the second product gas stream is delivered through a line 28 to the base of the concentrator 26.

The second product gas stream is counter-currently washed with water in the concentrator 26 to produce a "strong liquor" containing dissolved hydrogen sulfide. The "strong liquor" is withdrawn from the base of the concentrator 26 and recycled through a pump 30 and heat exchanger 31 back into the concentrator 26. A portion of the "strong liquor" is withdrawn through line 32 to a "strong liquor" storage facility. Make-up water such as coal water is delivered through line 29 during this alternative operation to compensate for the withdrawal of the "strong liquor" through the line 32. Any gases which are not absorbed in the concentrator 26 are withdrawn through a line 33 and introduced into the hydrogen sulfide scrubber along with coke oven gas.

Broken lines have been employed in FIG. 1 to indicate the flow patterns during this alternative operation of the prior art sulfur-ammonia process which utilizes the concentrator 26.

Figure 2:
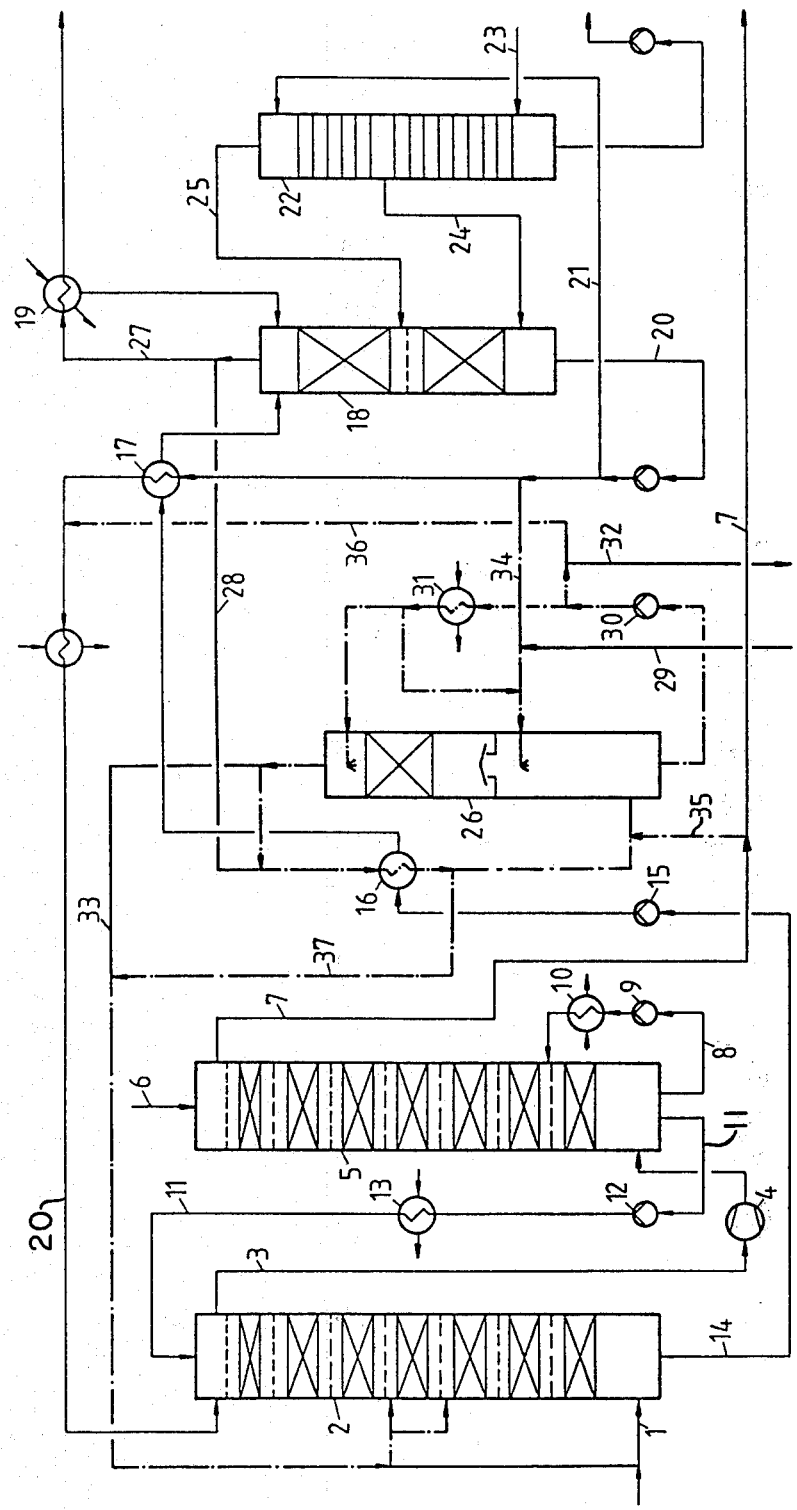
FIG. 2 shows the same installation of FIG. 1 operated in accordance with the present invention through the dash-dot broken lines for easy comparison with the established prior art of FIG. 1.

The present invention is illustrated in FIG. 2 wherein the same essential emements are included. However in FIG. 2, the concentrator/scrubber 26 is utilized as an ammonia scrubber while the second product gas stream is withdrawn through the line 27 for further processing—that is, during normal operation of the plant. In the embodiment illustrated in FIG. 2, the concentrator/scrubber receives as its liquid feed a portion of the third liquid effluent stream from the line 20 and 34. The concentrator/scrubber 26 receives as its gaseous stream a portion of the first product stream from the line 7 through a line 35. The gas-liquid contact from the upwardly flowing gas and the downwardly moving liquid strips out ammonia gas from the liquid. The washed gases including ammonia are withdrawn from the top of concentrator/scrubber 26 through a line 37 and delivered preferably to the mid-region of the hydrogen sulfide scrubber 2. The fifth liquid effluent stream from the base of the concentrator/scrubber 26 is recirculated through the pump 30 and heat exchanger 31 to the top of the concentrator/scrubber 26. A portion of the fifth liquid effluent stream is delivered through the line 36 and the line 20 to the top of the hydrogen sulfide scrubber 2 to serve as the portion of the ammoniacal wash water.

The introduction of ammonia-containing gases into the mid-region of the hydrogen sulfide scrubber 2 greatly increases the efficiency of the stripping action of the hydrogen sulfide stripper and increases the yield of hydrogen sulfide gas from the system and further improves the quality of the washed coke oven gas product.

During operation of the concentrator/scrubber 26 as a scrubber, added ammonia-rich gas from the ammonia still 22 may be introduced into the concentrator/scrubber 26 if desired.

I claim:

1. In the sulfur-ammonia process for recovering hydrogen sulfide from coke oven gas containing hydrogen sulfide and ammonia, comprising
    (a) a hydrogen sulfide stripping zone;
    (b) an ammonia stripping zone;
    (c) a deacidifying zone;
    (d) an ammonia distillation zone;
    (e) a concentrating/scrubbing zone;
   feeding said coke oven gas and ammoniacal wash water to said hydrogen sulfide stripping zone and removing a first washed gas stream having a lower hydrogen sulfide content than said coke oven gas and recovering a first effluent liquid stream including ammoniacal water and hydrogen sulfide;
   feeding said first washed gas stream to said ammonia stripping zone along with wash water to produce a second washed gas stream having a lower ammonia content than said first washed gas stream and producing a second effluent liquid stream;
   recovering said second washed gas stream as a first product gas stream of washed coke oven gas and returning said second effluent liquid stream to said hydrogen sulfide stripping zone as at least a portion of the required ammoniacal wash water;
   feeding said first effluent liquid stream to said deacidifying zone along with ammonia-rich gas to produce a second product gas stream containing hydrogen sulfide and to produce a third effluent liquid stream of wash water containing ammonia;
   stripping at least a portion of said third effluent liquid stream to produce a fourth effluent liquid stream and to produce the said ammonia-rich gas;
   delivering the said ammonia-rich gas to said deacidifying zone;
   the improvement in said process comprising operating said concentrating/scrubbing zone alternatively
   Firstly: as a scrubbing zone when said second product gas stream is continuously withdrawn as a product; introducing a portion of said first product gas stream into said concentrating/scrubber zone and washing therein with a portion of the said third effluent liquid stream to produce a third washed gas stream having a lower hydrogen sulfide content than the said second product gas stream and producing a fifth effluent liquid stream, recycling at least a portion of said fifth effluent liquid stream to said concentrating/scrubbing zone and delivering at least a portion thereof to said hydrogen sulfide stripping zone as a portion of the said ammoniacal wash water; and introducing said third washed gas stream into said hydrogen sulfide stripping zone along with the said coke oven gas; and
   Secondly: as a concentrating zone when said second product gas stream is delivered entirely to said concentrating/scrubbing zone, delivering a portion of said third effluent liquid stream to said concentrating/scrubbing zone to produce a third washed gas stream, returning said third washed gas stream to said hydrogen sulfide stripping zone along with coke oven gas; and withdrawing a portion of the said fifth effluent liquid stream as a strong liquor containing hydrogen sulfide.

2. The improvement of claim 1 wherein the said concentrating/scrubbing zone, when operating as a scrubbing zone, receives ammonia-rich gas from the said ammonia distillation zone.

3. A method according to claim 1, characterized in withdrawing an ammonia-containing gas by suction from said hydrogen sulfide scrubbing zone and delivering said ammonia-containing gas by pressure into the said ammonia stripping zone.

* * * * *

UNITED STATES PATENT AND TRADEMARK OFFICE
CERTIFICATE OF CORRECTION

PATENT NO. : 4,342,731

DATED : August 3, 1982

INVENTOR(S) : Horst Ritter

It is certified that error appears in the above-identified patent and that said Letters Patent are hereby corrected as shown below:

On the title page add:

-- [30] Foreign Application Priority Data

June 13, 1980 [DE] Fed. Rep. of Germany 3022180 --.

Signed and Sealed this

Sixteenth Day of November 1982

[SEAL]

Attest:

GERALD J. MOSSINGHOFF

Attesting Officer

Commissioner of Patents and Trademarks